(12) United States Patent
Kühne

(10) Patent No.: US 11,277,584 B2
(45) Date of Patent: Mar. 15, 2022

(54) METHOD AND SYSTEM FOR CARRYING OUT A VIRTUAL MEETING BETWEEN AT LEAST A FIRST PERSON AND A SECOND PERSON

(71) Applicant: AUDI AG, Ingolstadt (DE)

(72) Inventor: Marcus Kühne, Beilngries (DE)

(73) Assignee: AUDI AG, Ingolstadt (DE)

( * ) Notice: Subject to any disclaimer, the term of this patent is extended or adjusted under 35 U.S.C. 154(b) by 37 days.

(21) Appl. No.: 16/650,611

(22) PCT Filed: Sep. 12, 2018

(86) PCT No.: PCT/EP2018/074555
§ 371 (c)(1),
(2) Date: Mar. 25, 2020

(87) PCT Pub. No.: WO2019/063284
PCT Pub. Date: Apr. 4, 2019

(65) Prior Publication Data
US 2021/0203885 A1    Jul. 1, 2021

(30) Foreign Application Priority Data
Sep. 26, 2017   (DE) ................ 10 2017 217 025.5

(51) Int. Cl.
*G06F 3/048*     (2013.01)
*H04N 7/15*      (2006.01)
(Continued)

(52) U.S. Cl.
CPC ............ *H04N 7/157* (2013.01); *G06F 3/14* (2013.01)

(58) Field of Classification Search
CPC .. G06F 3/0481; G06F 3/04886; G06F 1/1643; G06F 21/34; G06F 2200/1614
See application file for complete search history.

(56) References Cited

U.S. PATENT DOCUMENTS 6,323,859 B1 * 11/2001 Gantt .................. G06T 19/20
                                                    345/419
6,462,733 B1 * 10/2002 Murakami ........... G06F 3/033
                                                    345/173
(Continued)

FOREIGN PATENT DOCUMENTS

CN    101285935 A    10/2008
CN    105607259 A     5/2016
(Continued)

OTHER PUBLICATIONS

Japanese Office Action dated Feb. 9, 2021, in Japanese Patent Application No. 2020-537849 (3 pages).
(Continued)

*Primary Examiner* — Nicholas Augustine
(74) *Attorney, Agent, or Firm* — Staas & Halsey LLP

(57) ABSTRACT

A virtual meeting is carried out between at least one first person and one second person, in which the virtual meeting is displayed in the form of a first virtual surrounding area by use of a first display device assigned to the first person and in the form of a second virtual surrounding area by use of a second display device assigned to the second person. The first person may be disposed in a moving vehicle whose vehicle movement is sensed and the representation of the first virtual surrounding area is selected in accordance with the sensed movement of the vehicle. The second person may be disposed in a reference system which differs from the vehicle and whose movement is sensed, and the representation of the second virtual surrounding area is selected in accordance with the sensed movement of the reference system.

14 Claims, 2 Drawing Sheets

(51) Int. Cl.
*G06F 3/14* (2006.01)
*G06F 3/01* (2006.01)

(56) References Cited

U.S. PATENT DOCUMENTS

| | | | |
|---|---|---|---|
| 8,514,221 B2* | 8/2013 | King | G06T 19/00 |
| | | | 345/419 |
| 10,284,794 B1* | 5/2019 | Francois | G06F 3/0484 |
| 10,659,405 B1* | 5/2020 | Chang | G06F 3/0481 |
| 2004/0102676 A1 | 5/2004 | Brendley et al. | |
| 2006/0015000 A1 | 1/2006 | Kim | |
| 2010/0053151 A1* | 3/2010 | Marti | G06F 3/017 |
| | | | 345/419 |
| 2010/0234094 A1* | 9/2010 | Gagner | G07F 17/32 |
| | | | 463/20 |
| 2011/0294579 A1* | 12/2011 | Marks | A63F 13/245 |
| | | | 463/36 |
| 2012/0249741 A1* | 10/2012 | Maciocci | G06T 15/503 |
| | | | 348/46 |
| 2013/0038599 A1 | 2/2013 | Krakowski | |
| 2013/0278631 A1* | 10/2013 | Border | G02C 5/143 |
| | | | 345/633 |
| 2014/0176296 A1 | 6/2014 | Morgan | |
| 2014/0362113 A1 | 12/2014 | Benson et al. | |
| 2015/0097860 A1 | 4/2015 | Alaniz et al. | |
| 2015/0309316 A1* | 10/2015 | Osterhout | G06F 3/03547 |
| | | | 345/8 |
| 2015/0355805 A1* | 12/2015 | Chandler | G06F 3/04817 |
| | | | 715/784 |
| 2016/0030134 A1* | 2/2016 | Shapter | A61B 34/25 |
| | | | 606/130 |
| 2017/0195627 A1 | 7/2017 | Sham | |
| 2017/0253252 A1 | 9/2017 | Donnelly et al. | |
| 2017/0351668 A1* | 12/2017 | Milan | G06F 16/93 |
| 2018/0089900 A1 | 3/2018 | Rober et al. | |
| 2018/0357836 A1 | 12/2018 | Ishiguro et al. | |
| 2019/0121522 A1* | 4/2019 | Davis | G06F 3/04815 |

FOREIGN PATENT DOCUMENTS

| | | |
|---|---|---|
| CN | 106200892 A | 12/2016 |
| CN | 106314152 A | 1/2017 |
| DE | 10106072 A1 | 8/2002 |
| DE | 10156219 C1 | 8/2003 |
| DE | 102014009298 A1 | 12/2015 |
| DE | 102014019579 A1 | 6/2016 |
| DE | 102015011590 A1 | 3/2017 |
| DE | 102017001787 A1 | 10/2017 |
| DE | 10 2017 217 025.5 | 3/2019 |
| JP | 2001-339799 | 12/2001 |
| JP | 2005-142765 | 6/2005 |
| JP | 2017-102516 | 6/2017 |
| JP | 2017-146963 | 8/2017 |
| WO | 2016/077180 A1 | 5/2016 |
| WO | 2017/025485 A1 | 2/2017 |
| WO | PCT/EP2018/074555 | 9/2018 |

OTHER PUBLICATIONS

International Search Report dated Dec. 7, 2018 from International Application No. PCT/EP2018/074555, 6 pages.
Germany Office Action dated Jun. 6, 2018 from German Patent Application No. 10 2017 217 025.5, 8 pages.
Translation of International Preliminary Report on Patentability dated Mar. 26, 2020 from International Application No. PCT/EP2018/074555, 10 pages.
Korean Office Action from Korean Application No. 10-2020-7011849 dated Oct. 15, 2021 (four pages).
Chinese Office Action dated Jun. 25, 2021, for Chinese Application No. 201880062173.2, 9 pages.

* cited by examiner

METHOD AND SYSTEM FOR CARRYING OUT A VIRTUAL MEETING BETWEEN AT LEAST A FIRST PERSON AND A SECOND PERSON

CROSS REFERENCE TO RELATED APPLICATIONS

This application is a U.S. national stage of International Application No. PCT/EP2018/074555 filed on Sep. 12, 2018. The International Application claims the priority benefit of German Application No. 10 2017 217 025.5 filed on Sep. 26, 2017. Both the International Application and the German Application are incorporated by reference herein in their entirety.

BACKGROUND

Described herein is a method and a system for carrying out a virtual meeting between at least one first person and one second person.

It is already known per se to use, for example, video conferencing and the like so that persons who are at different locations can exchange information and views. In the future, more and more people are also expected to use immersive technologies, such as for example virtual reality systems, in their vehicles, on the one hand to assist in performance of the driving task, but on the other hand also for entertainment. However, for example the use of virtual reality in vehicles is not always without problems, since many users can begin to feel nauseous as a result of incongruities between what is seen and movement of the vehicle. In other words, what is referred to as motion sickness can easily occur when using virtual reality in vehicles.

The use of virtual reality systems per se is already known. For example, German Patent Application 10 2015 011 590 A1 describes a method for operating a virtual reality system in which a person has put on virtual reality glasses, wherein an outsider who is not wearing the virtual reality glasses is depicted on a separate display, at which the person who has put on the virtual reality glasses is currently looking.

A further virtual reality system is described in German Patent Application 10 2014 009 298 A1. In this system it is possible that a person wearing virtual reality glasses who has put on a headset can hear another person who is located in the space in a directionally accurate fashion via the headsets. If the wearer of the virtual reality glasses moves around within a virtual surrounding area, the speech of the other person is therefore always transmitted via the headsets in such a way that the relative positioning between the two persons is taken into account.

Finally, German Patent Application 101 06 072 A1 describes a method for displaying visual information in a telecommunication device. An interlocutor is displayed in the form of an avatar within a virtual surrounding area.

SUMMARY

Described herein is a method and a system for carrying out a virtual meeting between at least two persons, which method and system can reduce the risk of the persons becoming nauseous while the virtual meeting is being carried out.

A method and a system for carrying out a virtual meeting between at least one first person and one second person is disclosed herein. Advantageous refinements with expedient and non-trivial developments are further described.

In the method described herein for carrying out a virtual meeting between at least one first person and one second person, the virtual meeting is displayed in the form of a first virtual surrounding area by use of a first display device assigned to the first person, and in the form of a second virtual surrounding area by use of a second display device assigned to the second person. In this context, the first person is in reality arranged in a moving vehicle whose vehicle movement is sensed, and the representation of the first virtual surrounding area is selected in accordance with the sensed movement of the vehicle. The second person is in reality located in a reference system which differs from the vehicle and whose movement is sensed, and the representation of the second virtual surrounding area is selected in accordance with the sensed movement of the reference system.

By use of the method described herein it is therefore possible to bring together the two persons in the form of a virtual meeting, even if the persons are at different locations. The first person is located in this context in a moving vehicle, wherein the other person is not located in this moving vehicle. In this context there is provision described herein that depending on the positioning of the two persons in reality, the respectively appropriate virtual surrounding area is included in a display or presented as a display to the two persons in such a way that they do not become nauseous. It is achieved by virtue of the fact that in the case of the first person the movement of the vehicle is taken into account and the representation of the first virtual surrounding area for the virtual meeting is correspondingly selected. The sensing of the movement of the vehicle can be carried out, for example, by use of a vehicle-side sensor system, wherein corresponding data which relate to the vehicle movement can be made available. For example, acceleration sensors or even speed sensors can be used. This data is then made available to the first display device which processes and takes into account this data and forms the representation of the first virtual surrounding area according to this data.

The second person can in reality be located, for example, in a space or else in another vehicle. Basically, the second person can be located in any desired reference system while the virtual meeting is being carried out. The movement of the reference system of the second person is also sensed, wherein the representation of the second virtual surrounding area for the displaying of the virtual meeting for the second person is selected in accordance with the sensed movement of the reference system.

Accordingly, both persons can hold a virtual meeting with one another without one of the persons becoming nauseous owing to an incongruity between the sensed actual movement owing to their respective real reference system and the representation of the respective virtual surrounding area.

One advantageous embodiment provides that in the first surrounding area an image of the second person is displayed from a virtual perspective of the first person, and in the second virtual surrounding area an image of the first person is displayed from a virtual perspective of the second person. In other words, the image is therefore an avatar, that is to say a digital image of the respective persons. The images of the persons can be photorealistic. For example, it is possible that respective image data of the persons is stored in an address book, wherein this image data is used during the setting up of the virtual meeting. Moreover, it is possible that sensors sense respective movements of the two persons, for example it is also possible to perform so-called motion capturing. Motion capturing is a generic term for a method with which genuine movements in real space can be tracked and translated into mathematical formulas, which are used to move a virtual figure or a virtual skeleton of the figure, in this case that is to say the respective virtual images within the virtual surrounding area of the two persons. This makes it possible to make the virtual meeting between the two persons particularly realistic. In this context, relative movements of the two persons with respect to the vehicle or to the reference systems which differ from the vehicle are for example converted into corresponding movements within the virtual surrounding area. If the first person moves, for example, forward within the vehicle, this movement is converted within the two virtual surrounding areas. The same also applies to the second person. If this person is located, for example, in a space in reality and moves around in the space, the locomotion of the second person in reality is converted into corresponding locomotion within the two displayed virtual surrounding areas.

A further advantageous embodiment provides that a relative orientation of the first person with respect to the vehicle is sensed, and the representation of the first virtual surrounding area is selected in accordance with the sensed relative orientation of the first person with respect to the vehicle. For example, it is possible that the first person has sat down on a vehicle seat which can be rotated through 180 degrees about the vertical axis. It is therefore possible, for example, that during the journey in the vehicle the person initially seats with their face forward in the direction of travel and then rotates the vehicle seat in such a way that the person is sitting with their back to the direction of travel, that is to say they feel they are travelling backwards. By taking into account the relative orientation of the person with respect to the vehicle and the corresponding adaptation of the representation of the first virtual surrounding area it is possible to ensure that the first person does not become nauseous while the virtual meeting is being carried out. This is because there is a definite difference whether one is accelerated backwards or forwards and how the virtual surrounding area is then consequently represented.

In a further advantageous refinement there is provision that a virtual platform which moves through a virtual environment in accordance with the sensed movement of the vehicle is displayed as the first virtual surrounding area. Therefore, from the virtual surrounding area of the first person, the virtual meeting takes place on this virtual platform, wherein the virtual environment moves past the first person according to the sensed movement of the vehicle from the virtual perspective of the person, since the virtual platform seems to move through the virtual surrounding area according to the sensed movement of the vehicle through the virtual environment. The visual stimuli which the first person therefore perceives therefore maps the information which the balance organ of the first person supplies on the basis of the locomotion with the vehicle. As a result, so-called motion sickness can be prevented or reduced to a minimum.

According to an alternative advantageous embodiment, there is provision that a virtual office, past whose windows a virtual environment moves in accordance with the sensed movement of the vehicle, is displayed as the first virtual surrounding area. As a result of the fact that the virtual environment moves past the windows of the virtual office it is also possible to ensure that the first person receives or can perceive from their virtual perspective at least certain visual stimuli which correspond to the information of their balance organ. As a result it is also possible to considerably reduce or completely prevent the phenomenon of motion sickness. Basically, any desired implementations of the respective virtual surrounding areas are possible and appropriate insofar as they provide the two persons in each case with visual feedback which accords with their relative movement of their reference system, that is to say either of the vehicle being driven or of the other reference system of the second person.

A further advantageous embodiment provides that if the reference system in which the second person is located in reality is a stationary surrounding area, the second virtual surrounding area is displayed in the form of a stationary virtual surrounding area. In this case, the virtual perception of the virtual surrounding area in the case of the second person corresponds to the perception which the balance organ of the second person provides. It is therefore possible that the second person does not become nauseous during the virtual meeting, that is to say so-called motion sickness does not occur or is at least reduced to a minimum.

In a further advantageous refinement there is provision that if the reference system in which the second person is located in reality is also a moving vehicle whose movement is sensed and the representation of the second virtual surrounding area is selected in accordance with the sensed second movement of the vehicle. In this case it is also ensured that the phenomenon of motion sickness does not occur or is reduced to a minimum in the case of the second person. It is therefore also possible that both persons are travelling in different vehicles, wherein the two persons are holding a virtual meeting, and wherein the respective virtual surroundings are adapted to the respective movement of the vehicle.

According to a further advantageous embodiment there is provision that the display devices are respective virtual reality glasses by use of which the respective surrounding areas are displayed. As a result, the virtual meeting can be perceived particularly realistically by the two persons, since the sets of virtual reality glasses cover the entire field of vision of the respective persons so that the two persons feel that they are immersed completely in the respective virtual surrounding areas. Instead of the sets of virtual reality glasses it is, however, also possible to use any desired other display devices so that, for example, the first person only has put on virtual reality glasses while they are sitting in a vehicle while the other person, if they are sitting, for example, in an office, looks at a monitor instead of through virtual reality glasses, and the virtual surroundings which are suitable for them are displayed by use of the monitor.

The system described herein for carrying out a virtual meeting between at least one first person and one second person includes a first display device which is assigned to the first person and has the purpose of displaying the virtual meeting in the form of a first virtual surrounding area, wherein the first display device is configured to select the representation of the first virtual surrounding area in accordance with the sensed movement of the vehicle as a function of a sensed vehicle movement of a vehicle in which the first person is arranged. Furthermore, the system described herein includes a second display device which is assigned to the second person and has the purpose of displaying the virtual meeting in the form of a second virtual surrounding area, wherein the second display device is configured to select the representation of the second virtual surrounding area as a function of a sensed movement of a reference system which differs from the vehicle and in which the second person is arranged. Both display devices for example include respective control devices which can perform the adaptation of the respective virtual surrounding areas. The display devices for example may also have respective data interfaces by use of which a wide variety of data which describe the movement of the vehicle or the movement of the reference system of the second person can be received. Advantageous refinements of the method described herein are to be considered as advantageous refinements of the system described herein, and vice versa, wherein the system has, for example, structure for carrying out the method operations.

Further advantages, features and details emerge from the following description of example embodiments as well as by reference to the drawings. The features and combinations of features which are described above in the description and the features and combinations of features which are described below in the description of the drawings and/or merely shown in the drawings can be used not only in the respectively specified combination but also in other combinations or alone without departing from the scope of the disclosure.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Reference will now be made in detail to examples of which are illustrated in the accompanying drawings. Identical or functionally identical elements have been provided with the same reference symbols.

Figure 1:
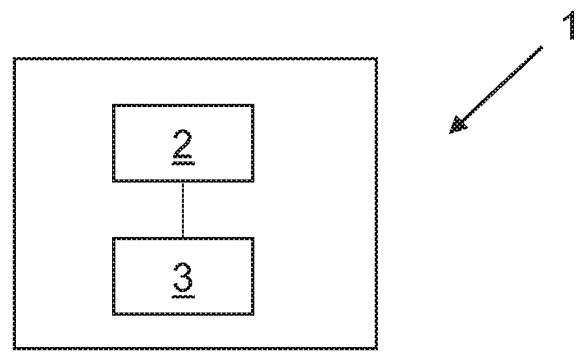
FIG. 1 is a schematic illustration of a system for carrying out a virtual meeting between two persons.

A system 1 for carrying out a virtual meeting between at least two persons is shown in a highly schematic illustration in FIG. 1. The system 1 includes two display devices 2, 3 which can be used by respective persons which wish to carry out a virtual meeting. The system 1 serves, for example, to permit virtual meetings between persons who are at entirely different locations.

Figure 2:
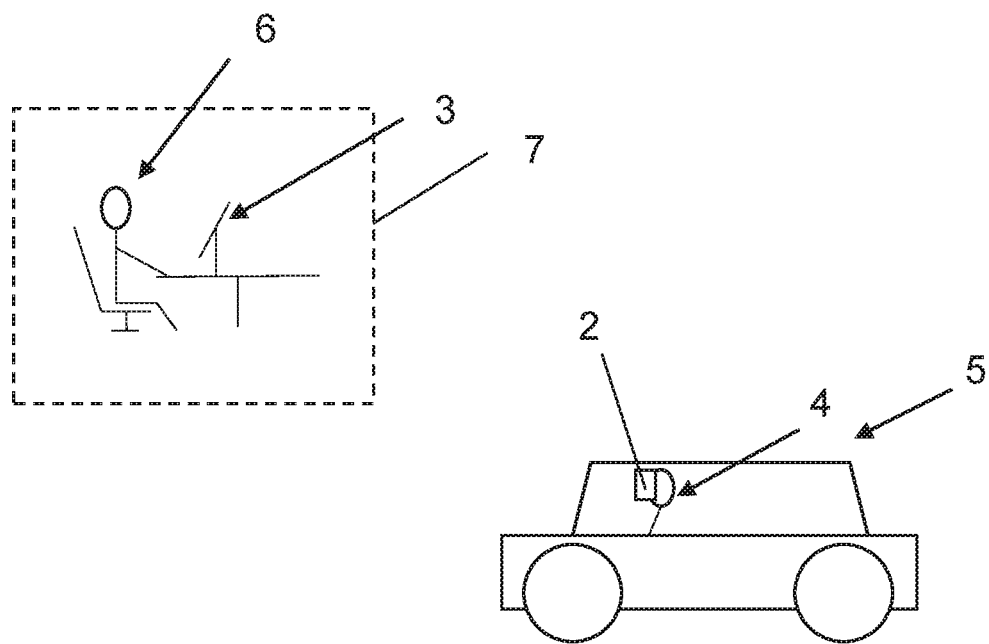
FIG. 2 is a schematic illustration of a person who is sitting at a desk and a person who is sitting in a vehicle, which persons are currently holding a virtual meeting via a monitor or via virtual reality glasses which have been put on, by utilizing the system illustrated schematically in FIG. 1.

FIG. 2 illustrates, by way of example, a scenario in which such a virtual meeting can be carried out by use of a system 1. In the example, the display devices 2, 3 of the system 1 include, on the one hand, a set of virtual reality glasses 2 and, on the other hand, a screen 3. A first person 4 who has put on the virtual reality glasses 2 is currently sitting in a vehicle 5 being driven. It may be the case, for example, that the vehicle 5 is currently driving completely autonomously so that the person 4 can have put on the virtual reality glasses 2 without risk, even if the person is the driver. Of course, the person 4 can also be a front seat passenger.

A second person 6 is currently sitting in their office 7 which therefore constitutes the reference system of the person 6, and the person is looking at the screen 3. Both persons 4, 6 can hold a virtual meeting with one another by utilizing the system 1.

Figure 3:
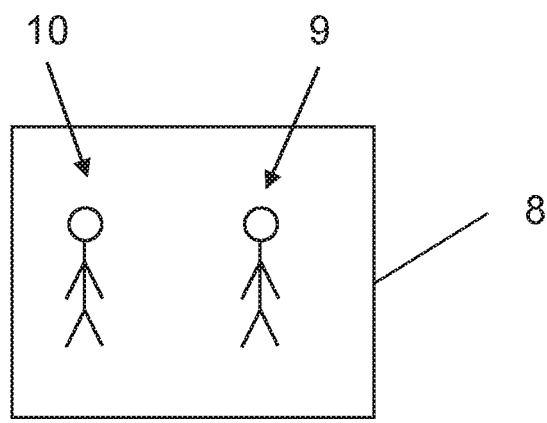
FIG. 3 is a schematic illustration of the virtual meeting between the two persons, which meeting is displayed in the form of a first virtual surrounding area by use of the virtual reality glasses.

FIG. 3 shows a highly schematic illustration of a virtual surrounding area 8, in the form of which the virtual meeting between the two persons 4, 6 is represented by use of the virtual reality glasses 2. Respective images 9, 10 of the two persons 4, 6 are illustrated schematically for the purpose of illustration. The image 9 corresponds here, within the virtual surrounding area 8, to the person 4 sitting in the vehicle 5, wherein the image 10 corresponds to the person 6 sitting in the office 7. In this context, the person 4 who is sitting in the vehicle 5 sees by use of their virtual reality glasses 2, from the virtual position characterized by the image 9, the image 10 of the person 6 who is sitting in their office 7.

Figure 4:
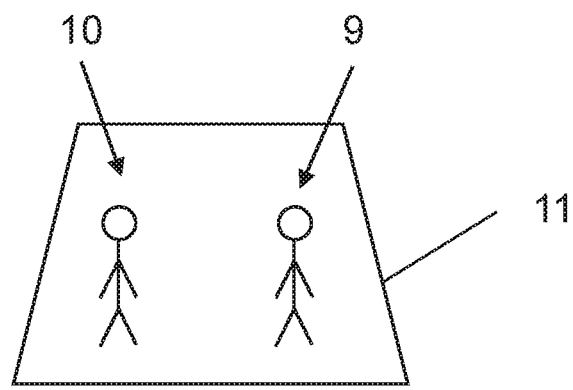
FIG. 4 is a further schematic illustration of the virtual meeting which is displayed in the form of a second virtual surrounding area by use of the screen.

FIG. 4 shows a second virtual surrounding area 11, in the form of which the virtual meeting between the two persons 4, 6 is represented by use of the screen 3. The two images 9, 10 of the two persons 4, 6 are in turn illustrated schematically for purposes of illustration. The person 6 sitting in their office 7 looks through the screen 3 or, for example, by use of the screen 3, at the virtual surrounding area 11, for example from the virtual perspective which is characterized by the positioning of the image 10.

For example it is also possible to use the motion capturing method, so that during the virtual meeting the two persons 4, 6 can view particularly realistic movements of the images 9, 10 within the respective virtual surrounding area 8, 11, for example they can also view the movement of their own virtual limbs and the like.

A particular challenge when holding such virtual meetings in the following example is that the person 4 is moving with the vehicle 5 while the person 6 is arranged in their office 7, that is to say the reference system of the person 6 is not moving, in contrast to the reference system of the person 4, which is the vehicle 5.

In order to prevent two persons 4, 6 becoming nauseous while the virtual meeting is being held, that is to say to prevent so-called motion sickness occurring, there is provision that the virtual reality glasses 2 and the screen 3 respectively display the different virtual surrounding areas 8, 11, specifically suitably matched to how the respective reference systems of the persons 4, 6, that is to say the moving vehicle 5 and the stationary office 7, move or do not move.

A wide variety of data items relating to the movement of the vehicle 5 are acquired, wherein the representation of the first surrounding area 8 by use of the virtual reality glasses 2 is selected in accordance with the sensed movement of the vehicle. Likewise, the movement of the reference system of the second person 6, that is to say of the office 7, is sensed, wherein the representation of the second virtual surrounding area 11, which is displayed by use of the screen 3, onto the sensed movement of the office 7 is therefore selected in the example by virtue of the fact that, of course, the office 7 does not move.

The virtual surrounding area 8 for representing the virtual meeting is selected, for example, in such a way that the set of virtual reality glasses 2 is a platform (not characterized in more detail here) on which the two images 9, 10 of the two real persons 4, 6 are located, wherein this platform moves through a virtual environment corresponding to the sensed movement of the vehicle 5.

In contrast, the virtual surrounding area 11 can be selected in such a way that through the screen 3 the second person 6 simply sees a virtual office space which does not move at all. Both persons 4, 6 therefore see such virtual surrounding areas 8 and 11 which are adapted to the movement of their respective reference system, that is to say of the vehicle 5 or of the office 7. This can prevent the two persons 4, 6 experiencing so-called motion sickness while the virtual meeting is being held.

Likewise, instead of being in an office 7 the person 6 can also be sitting, for example, in a vehicle (not illustrated here), wherein in this case the movement of this vehicle is then sensed and adapted in the representation of the virtual meeting for the person 6. In this case, the person 6 can wear, for example, a pair of virtual reality glasses (not illustrated here either), wherein the representation is implemented in a way analogous to that described above.

The two persons 4, 6 can therefore remain at any desired locations and in any desired reference systems, wherein the movement of the respective reference systems occurs during the representation of the virtual surrounding areas 8, 11 which are adapted to the person. Of course, such virtual meetings can also be carried out between more than two persons, in which case, the respective movement or in fact non-movement of the respective reference systems in which the persons are located in reality are for example also taken into account in the respective precisely tailored representation of the virtual meetings in the form of respective virtual surrounding area.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for carrying out a virtual meeting between a first person located in a vehicle and a second person located in a reference location, different from the vehicle, the method comprising:
   displaying, by a first display device viewable by the first person, the virtual meeting for viewing by the first person by displaying a first virtual surrounding area which is selectively represented by the first display device in accordance with a sensed movement of the vehicle and in accordance with a sensed relative orientation of the first person with respect to the vehicle, the first virtual surrounding area including an image of the second person from a virtual perspective of the first person and the first virtual surrounding area including a first virtual environment which moves past the first person according to the sensed movement of the vehicle from the virtual perspective of the first person, to prevent the first person from becoming nauseous; and
   displaying, by a second display device viewable by the second person, the virtual meeting for viewing by the second person by displaying a second virtual surrounding area selectively represented by the second display device in accordance with a sensed movement of the reference location, the second virtual surrounding area including an image of the first person from a virtual perspective of the second person and the second virtual surrounding area including a second virtual environment which moves past the second person according to the sensed movement of the reference location from the virtual perspective of the second person, to prevent the second person from becoming nauseous.

2. The method according to claim 1, wherein the first virtual surrounding area includes a virtual platform which moves through the virtual environment in accordance with the sensed movement of the vehicle.

3. The method according to claim 1, wherein the first virtual surrounding area includes a virtual office, past whose windows the virtual environment moves in accordance with the sensed movement of the vehicle.

4. The method according to claim 1, wherein when the reference location in which the second person is located is stationary, the second virtual surrounding area is displayed as a stationary virtual surrounding area.

5. The method according to claim 1, wherein when the reference location is another vehicle whose movement is sensed, the second virtual surrounding area is selectively represented by the second display device in accordance with a sensed movement of the another vehicle.

6. The method according to claim 1, wherein
   the first display device includes virtual reality glasses by which the first virtual surrounding area is displayed, and
   the second display device includes virtual reality glasses by which the second virtual surrounding area is displayed.

7. The method according to claim 1, further comprising sensing, by a sensor, a relative orientation of the first person with respect to the vehicle.

8. A system for carrying out a virtual meeting between a first person located in a vehicle and a second person located in a reference location, different from the vehicle, the system comprising:
   a first display device, viewable by the first person, configured:
      to display the virtual meeting for viewing by the first person by displaying a first virtual surrounding area which is selectively represented by the first display device in accordance with a sensed movement of the vehicle and in accordance with a sensed relative orientation of the first person with respect to the vehicle,
      to display in the first virtual surrounding area an image of the second person from a virtual perspective of the first person, and
      to display in the first virtual surrounding area a first virtual environment which moves past the first person according to the sensed movement of the vehicle from the virtual perspective of the first person, to prevent the first person from becoming nauseous; and
   a second display device, viewable by the second person, configured:
      to display the virtual meeting for viewing by the second person by displaying a second virtual surrounding area selectively represented by the second display device in accordance with a sensed movement of the reference location,
      to display in the second virtual surrounding area an image of the first person from a virtual perspective of the second person, and
      to display in the second virtual surrounding area a second virtual environment which moves past the second person according to the sensed movement of the reference location from the virtual perspective of the second person, to prevent the second person from becoming nauseous.

9. The system according to claim 8, further comprising a sensor configured to sense a relative orientation of the first person with respect to the vehicle.

10. The system according to claim 8, wherein the vehicle includes at least one of an acceleration sensor or a speed sensor configured to sense a movement of the vehicle.

11. The system according to claim 8, wherein
the first display device includes virtual reality glasses by which the first virtual surrounding area is displayed, and
the second display device includes virtual reality glasses by which the second virtual surrounding area is displayed.

12. The method according to claim 1, wherein
movement of the second person in the reference location is converted into a corresponding movement of the image of the second person in the first virtual surrounding area, and
movement of the first person in the vehicle is converted into a corresponding movement of the image of the first person in the second virtual surrounding area.

13. The method according to claim 1, further comprising:
sensing, by a vehicle sensor, movement of the vehicle;
transmitting, by the vehicle sensor, data corresponding to the movement of the vehicle sensed by the vehicle sensor, to the first display device; and
forming a representation of the first virtual surrounding area, based on the data.

14. The method according to claim 1, wherein
when the reference location is another vehicle whose movement is sensed, the second virtual surrounding area is selectively represented by the second display device in accordance with a sensed movement of the another vehicle, and
the second virtual environment moves past the second person according to the sensed movement of the another vehicle from the virtual perspective of the second person, to prevent the second person from becoming nauseous.

* * * * *